United States Patent
Kameda et al.

(10) Patent No.: US 8,989,973 B2
(45) Date of Patent: Mar. 24, 2015

(54) VEHICLE AND CONTROL APPARATUS FOR AUTOMATIC TRANSMISSION

(71) Applicant: Honda Motor Co., Ltd., Tokyo (JP)

(72) Inventors: Shintaro Kameda, Wako (JP); Kohsaku Matsuo, Wako (JP); Eri Kubota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/231,750

(22) Filed: Apr. 1, 2014

(65) Prior Publication Data

US 2014/0303858 A1    Oct. 9, 2014

(30) Foreign Application Priority Data

Apr. 3, 2013   (JP) ................................. 2013-077462

(51) Int. Cl.
  *F16H 61/02*   (2006.01)
  *F16H 3/62*    (2006.01)

(52) U.S. Cl.
  CPC .... *F16H 61/0204* (2013.01); *F16H 2200/2012* (2013.01); *F16H 2200/2048* (2013.01); *F16H 2200/006* (2013.01)
  USPC ............................. 701/51; 475/278; 475/296

(58) Field of Classification Search
  USPC .......................... 475/278, 296; 701/51, 55, 58
  See application file for complete search history.

(56) References Cited

U.S. PATENT DOCUMENTS

| | | | | |
|---|---|---|---|---|
| 2007/0202983 | A1* | 8/2007 | Gumpoltsberger | 475/278 |
| 2008/0153664 | A1* | 6/2008 | Tabata et al. | 477/37 |
| 2008/0184978 | A1* | 8/2008 | Sagawa et al. | 123/679 |
| 2009/0118915 | A1* | 5/2009 | Heap et al. | 701/51 |
| 2011/0195814 | A1* | 8/2011 | Hart et al. | 475/296 |

FOREIGN PATENT DOCUMENTS

| | | |
|---|---|---|
| JP | 2775951 B2 | 9/1991 |
| JP | 2005-273768 | 10/2005 |
| JP | 2008-051152 | 3/2008 |

OTHER PUBLICATIONS

Japanese Office Action for corresponding JP Application No. 2013-077402, Sep. 25, 2014.

* cited by examiner

*Primary Examiner* — Edwin A Young
(74) *Attorney, Agent, or Firm* — Mori & Ward, LLP

(57) ABSTRACT

A control apparatus for an automatic transmission includes a running condition detector and a controller. a plurality of gear change stages include at least one specific gear change stage that has a specific transmission gear ratio, that involves at least one necessary engagement mechanism which needs to be engaged in order to obtain the specific transmission gear ratio, and that involves at least one no-change engagement mechanism which causes no change in the specific transmission gear ratio. Both of the at least one necessary engagement mechanism and the at least one no-change engagement mechanism are engaged during a time period from a timing to begin an operation to change a gear change stage to the specific gear change stage until a timing to complete the operation. The at least one no-change engagement mechanism is released after the timing to complete the operation.

5 Claims, 9 Drawing Sheets

FIG. 5

|      | C1 | C2  | C3  | B1 | B2 | B3 | B4 |
|------|----|-----|-----|----|----|----|----|
| Rvs  |    |     | ○   |    | ○  | ○  |    |
| 1st  |    |     |     | ○  | ○  | ○  |    |
| 2nd  |    | ○   |     | ○  |    | ○  |    |
| 3rd  |    |     | ○   | ○  |    | ○  |    |
| 4th  |    | ○   | ○   | ○  |    |    |    |
| 5thN | ○  |     |     | ○  |    |    |    |
| 5thA | ○  |     | (○) | ○  |    |    |    |
| 5thB | ○  | (○) |     | ○  |    |    |    |
| 6th  | ○  | ○   | ○   |    |    |    |    |
| 7th  | ○  |     | ○   |    |    | ○  |    |
| 8th  | ○  | ○   |     |    |    | ○  |    |

FIG. 6A

| TRANSMISSION MODE | ENGAGEMENT ELEMENT FOR SHIFT | |
|---|---|---|
| 3rd ⇔ 5thA | C1(3rd) | B2(5thA) |
| 4th ⇔ 5thA | C1(4th) | C2(5thA) |
| 5thA ⇔ 6th | B1(5thA) | C2(6th) |
| 5thA ⇔ 7th | B1(5thA) | B3(7th) |

FIG. 6B

| TRANSMISSION MODE | ENGAGEMENT ELEMENT FOR SHIFT | |
|---|---|---|
| 2nd ⇔ 5thB | C2(2nd) | B3(5thB) |
| 4th ⇔ 5thB | C1(4th) | C2(5thB) |
| 5thB ⇔ 6th | B1(5thB) | C3(6th) |
| 5thB ⇔ 8th | B1(5thB) | B3(8th) |

FIG. 9

|      | C1 | C2  | C3  | B1 | B2 | B3 | B4 |
|------|----|-----|-----|----|----|----|----|
| Rvs  |    |     | ○   |    | ○  | ○  |    |
| Low  |    |     |     | ○  | ○  | ○  |    |
| 2nd  |    | ○   |     | ○  |    | ○  |    |
| 3rd  |    |     | ○   | ○  |    | ○  |    |
| 4th  |    | ○   | ○   | ○  |    |    |    |
| 5thN | ○  |     |     | ○  |    |    |    |
| 5thA | ○  |     | (○) | ○  |    |    |    |
| 5thB | ○  | (○) |     | ○  |    |    |    |
| 6th  | ○  | ○   | ○   |    |    |    |    |
| 7th  | ○  |     | ○   |    |    | ○  |    |
| 8th  | ○  | ○   |     |    |    | ○  |    |
| 9th  | ○  |     |     |    |    | ○  | ○  |
| 10th | ○  | ○   |     |    |    |    | ○  |

US 8,989,973 B2

VEHICLE AND CONTROL APPARATUS FOR AUTOMATIC TRANSMISSION

CROSS-REFERENCE TO RELATED APPLICATIONS

The present application claims priority under 35 U.S.C. §119 to Japanese Patent Application No. 2013-077462, filed Apr. 3, 2013, entitled "Control Apparatus for Automatic Transmission." The contents of this application are incorporated herein by reference in their entirety.

BACKGROUND

1. Field

The present disclosure relates to a vehicle and a control apparatus for an automatic transmission.

2. Description of the Related Art

Known conventional multi-stage automatic transmissions have a planetary gear mechanism. Such an automatic transmission disclosed, for example, in Japanese Unexamined Patent Application Publication No. 2005-273768 is able to make gear change to any of eight forward gear stages by using a first planetary gear mechanism for input, second and third two planetary gear mechanisms for gear change, and six engagement mechanisms including friction clutches and brakes.

In the above-mentioned automatic transmission, increase in a rotational difference between friction members of any of the engagement mechanisms with respect to the input rotation with a predetermined gear change stage selected may cause an excessive work loss of the engagement mechanism. Consequently, reduction in the acceleration of a vehicle and/or an increase in the temperature of hydraulic oil in the automatic transmission may occur.

On the other hand, in a multi-stage automatic transmission, for the sake of improvement of the fuel efficiency and driving performance (drivability) of the vehicle, it is necessary to increase the flexibility of shifting to a gear change stage by achieving quick and smooth operation allowing not only gear change to an adjacent gear change stage, but also skip gear change with one stage or two stages skipped. For this purpose, by achieving a skip gear change using only, for example, engagement shift between two of a plurality of engagement mechanisms, quick and smooth gear change operation may be implemented and variation of shifting between gear change stages may be increased.

In Japanese Patent No. 2775951 describes a conventional technology related to the above-described rotational difference of an engagement mechanism. The automatic transmission described in Japanese Patent No. 2775951 has multiple engagement combinations in pattern as engagement combinations of engagement mechanisms for achieving a predetermined gear change stage. When gear change is made to a target gear change stage from the predetermined gear change stage for an engagement combination pattern in which a rotational difference of a rotational member increases, the engagement combination is changed to another engagement combination pattern in which a rotational difference of a rotational member decreases, and then gear change is made to the target gear change stage.

SUMMARY

According to one aspect of the present invention, a control apparatus for an automatic transmission includes a running condition detector and a controller. The automatic transmission includes an input shaft, a plurality of planetary gear mechanisms, and a plurality of engagement mechanisms. Driving force generated by a drive source of a vehicle is transferred to the input shaft. The plurality of planetary gear mechanisms each include rotational elements having a sun gear, a carrier, and a ring gear. The plurality of engagement mechanisms each are configured to releasably connect two of the rotational elements of the plurality of planetary gear mechanisms or to releasably fix at least one of the rotational elements to a member on a fixed side. The automatic transmission is configured to achieve a plurality of gear change stages with different transmission gear ratios by changing an engagement combination state of the plurality of engagement mechanisms. The running condition detector is configured to detect a running condition of the vehicle. The controller is configured to set one of the plurality of gear change stages according to the running condition of the vehicle detected by the running condition detector. The plurality of gear change stages include at least one specific gear change stage that has a specific transmission gear ratio, that involves at least one necessary engagement mechanism which needs to be engaged in order to obtain the specific transmission gear ratio, and that involves at least one no-change engagement mechanism which causes no change in the specific transmission gear ratio. Both of the at least one necessary engagement mechanism and the at least one no-change engagement mechanism are engaged during a time period from a timing to begin an operation to change a gear change stage to the specific gear change stage until a timing to complete the operation. The at least one no-change engagement mechanism is released after the timing to complete the operation.

According to another aspect of the present invention, a vehicle includes a drive source, an automatic transmission, and a control apparatus. The automatic transmission includes an input shaft, a plurality of planetary gear mechanisms, and a plurality of engagement mechanisms. Driving force generated by the drive source is transferred to the input shaft. The plurality of planetary gear mechanisms each include rotational elements having a sun gear, a carrier, and a ring gear. The plurality of engagement mechanisms each are configured to releasably connect two of the rotational elements of the plurality of planetary gear mechanisms or to releasably fix at least one of the rotational elements to a member on a fixed side. The automatic transmission is configured to achieve a plurality of gear change stages with different transmission gear ratios by changing an engagement combination state of the plurality of engagement mechanisms. The control apparatus includes a running condition detector and a controller. The running condition detector is configured to detect a running condition of the vehicle. The controller is configured to set one of the plurality of gear change stages according to the running condition of the vehicle detected by the running condition detector. The plurality of gear change stages include at least one specific gear change stage that has a specific transmission gear ratio, that involves at least one necessary engagement mechanism which needs to be engaged in order to obtain the specific transmission gear ratio, and that involves at least one no-change engagement mechanism which causes no change in the specific transmission gear ratio. Both of the at least one necessary engagement mechanism and the at least one no-change engagement mechanism are engaged during a time period from a timing to begin an operation to change a gear change stage to the specific gear change stage until a timing to complete the operation. The at least one no-change engagement mechanism is released after the timing to complete the operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating the state of engagement mechanism for each of the gear change stages of the automatic transmission according to the first embodiment.

FIGS. 6A and 6B are tables illustrating shifting states of engagement mechanism in gear change from the 5th gear stage or to the 5th gear stage; FIG. 6A is a table illustrating shifting states of engagement mechanism of the 5th gear stage A mode; and FIG. 6B is a table illustrating shifting states of engagement mechanism of the 5th gear stage B mode.

FIG. 9 is a diagram illustrating the state of engagement mechanism for each of the gear change stages in the automatic transmission according to the second embodiment.

DESCRIPTION OF THE EMBODIMENTS

Figure 1:
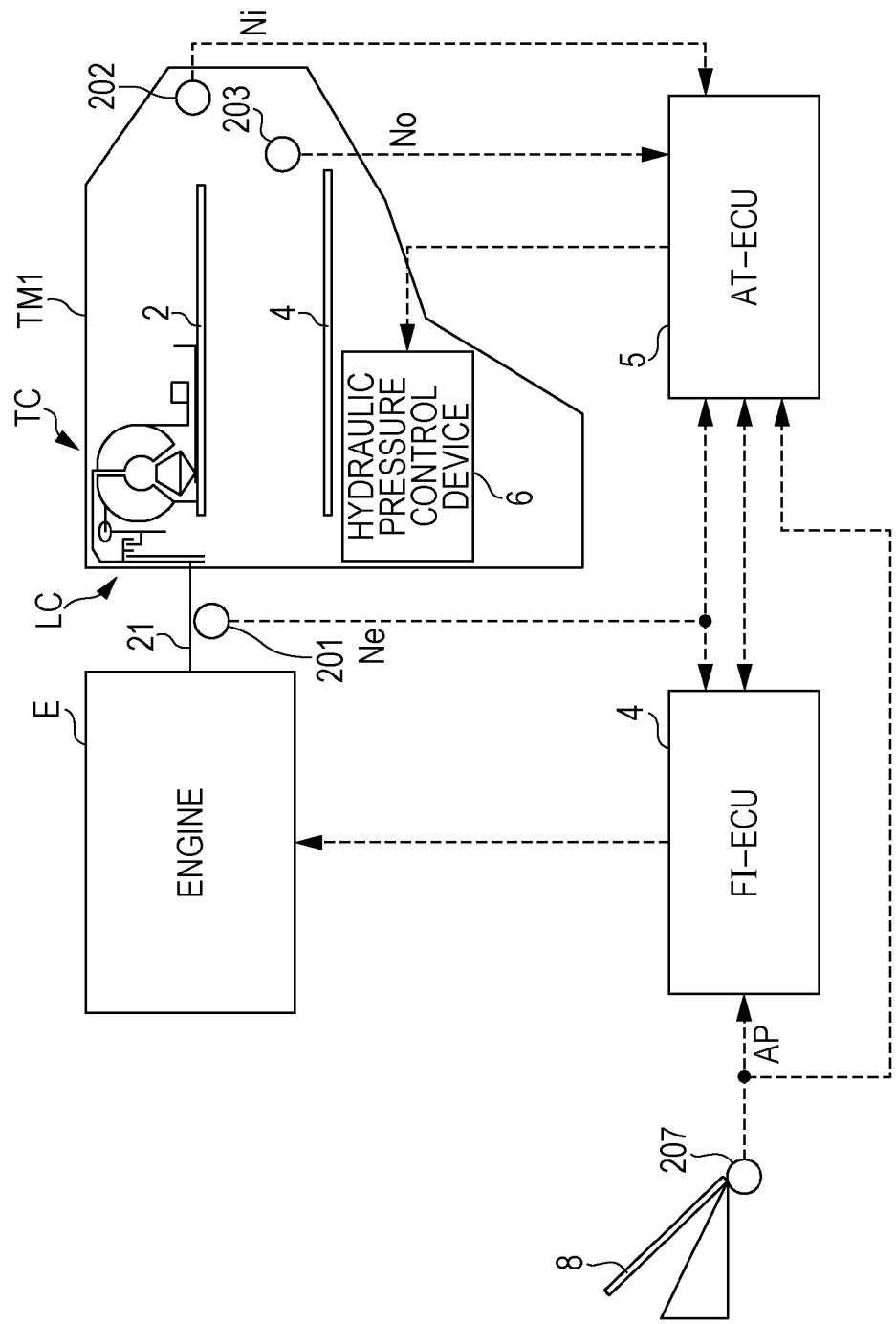
FIG. 1 is a schematic diagram of a drive system of a vehicle equipped with an automatic transmission according to an embodiment of the present disclosure.

The embodiments will now be described with reference to the accompanying drawings, wherein like reference numerals designate corresponding or identical elements throughout the various drawings.

Hereinafter, an embodiment of the present disclosure will be described in detail with reference to the accompanying drawings.

First Embodiment

FIG. 1 is a schematic diagram of a drive system of a vehicle equipped with an automatic transmission according to an embodiment of the present disclosure. As illustrated in FIG. 1, the vehicle of the present embodiment includes an internal combustion engine (engine) E which is a drive source, an automatic transmission TM1 connected to the engine E via a hydraulic torque converter TC, a fuel injection control unit (FI-ECU) 4 to control the engine E electronically, an automatic transmission control unit (AT-ECU) 5 (control unit 5) to electronically control the automatic transmission TM1 including the torque converter TC, and a hydraulic pressure control device 6 to control rotational drive and lock-up of the torque converter TC and joint (engagement)/release of a plurality of friction engagement mechanisms included in the automatic transmission TM1 according to the control of the AT-ECU 5.

The rotational output of the engine E is outputted to a crankshaft (output shaft of the engine E) 21, and transmitted to an input shaft 2 of the automatic transmission TM1 via the torque converter TC. The torque converter TC is provided with a lock-up clutch LC. The lock-up clutch LC sets lock-up ON or OFF state according to the lock-up control by the AT-ECU 5.

A crankshaft rotational speed sensor 201 for detecting a rotational speed Ne of the crankshaft 21 (engine E) is provided in the vicinity of the crankshaft 21. An input shaft rotational speed sensor 202 for detecting a rotational speed (rotational speed of the input shaft of the automatic transmission TM1) Ni of the input shaft 2 is provided in the vicinity of the input shaft 2. An output shaft rotational speed sensor 203 for detecting a rotational speed (rotational speed of the output shaft of the automatic transmission TM1) No of an output shaft 4 is provided in the vicinity of the output shaft 4. The rotational speed data Ne, Ni, No detected by the respective sensors 201 to 203 and vehicle speed data calculated based on No are supplied to the AT-ECU 5. The engine rotational speed data Ne is supplied to the FI-ECU 4. An accelerator pedal opening sensor 207 for detecting opening (accelerator pedal opening) APAT of an accelerator pedal 8 is provided in the vicinity of the accelerator pedal 8, the accelerator pedal opening sensor 207 being connected to the accelerator pedal 8 via a wire or the like which is not illustrated. Accelerator pedal opening data detected by the accelerator pedal opening sensor 207 is outputted to the FI-ECU 4 and the AT-ECU 5.

Figure 2:
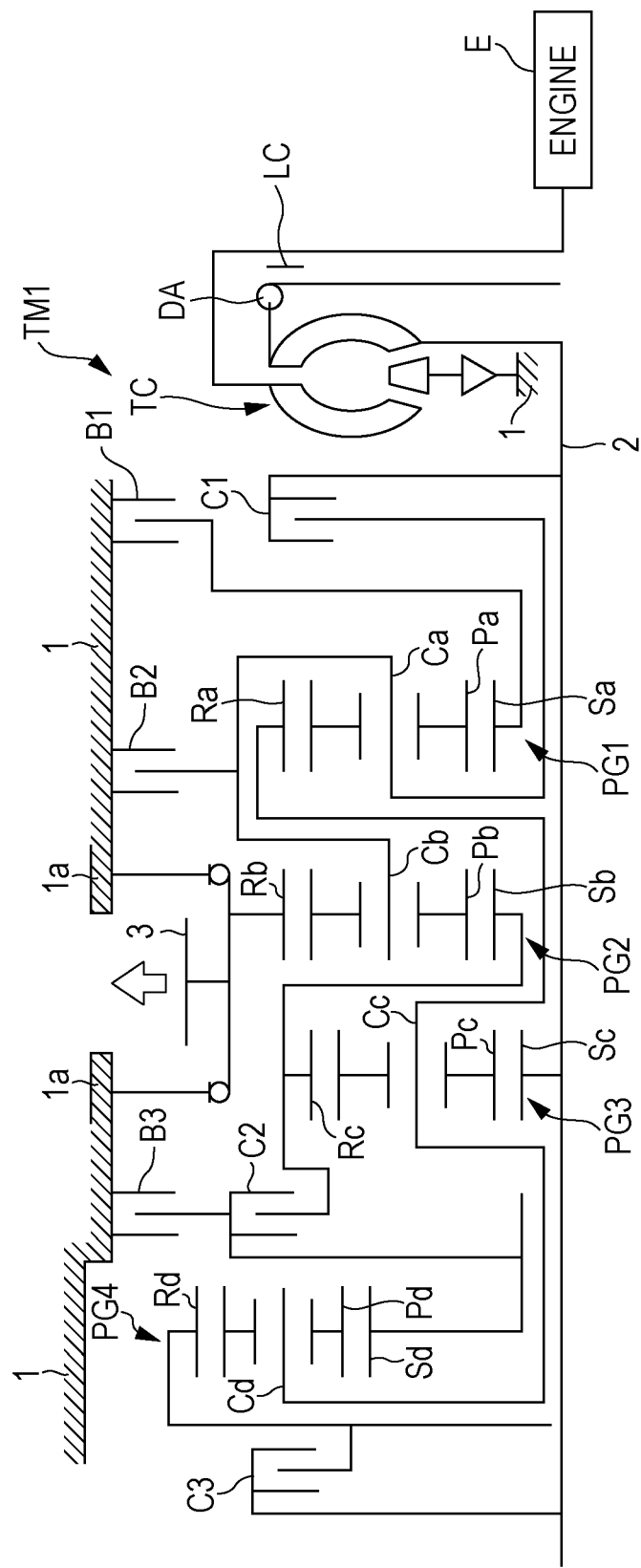
FIG. 2 is a skeleton diagram illustrating an automatic transmission according to a first embodiment of the present disclosure.
Figure 3:
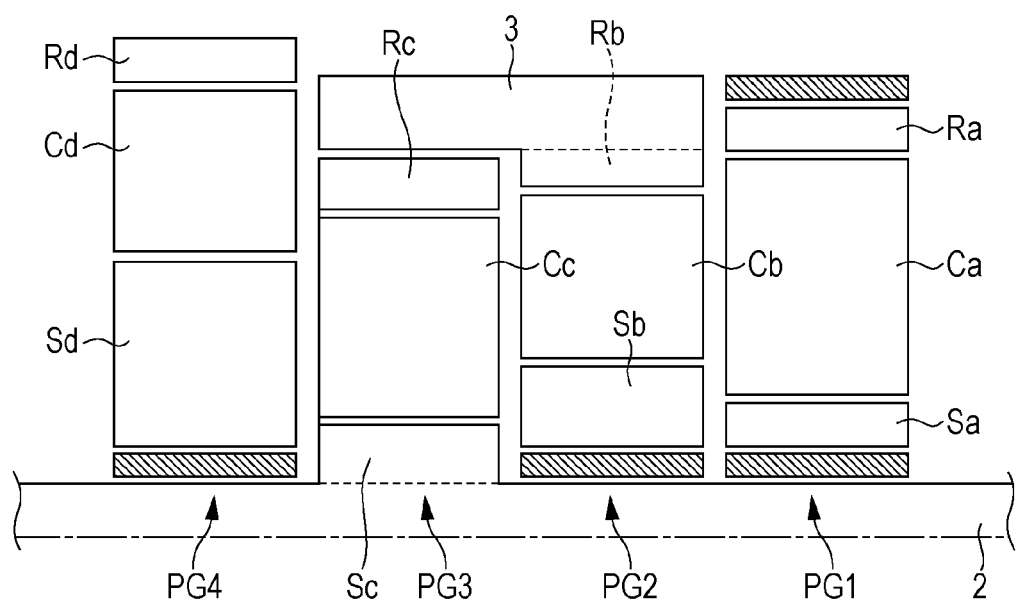
FIG. 3 is a schematic diagram illustrating the arrangement of the components of first to fourth planetary gear mechanisms included in the automatic transmission.
Figure 4:
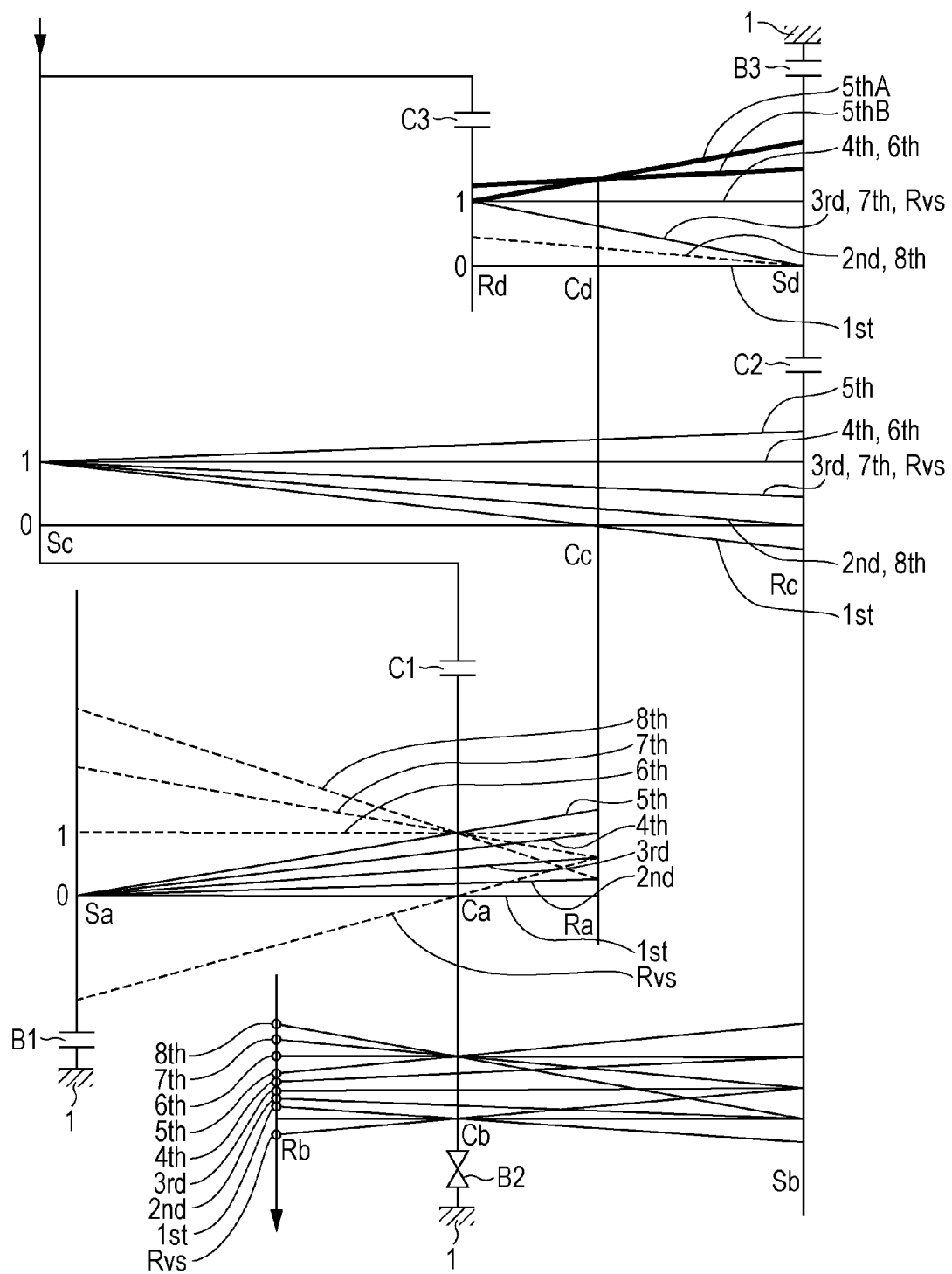
FIG. 4 is a nomogram illustrating ratios between relative speeds of the components of the first to fourth planetary gear mechanisms included in the automatic transmission according to the first embodiment.

FIG. 2 is a skeleton diagram illustrating the automatic transmission TM1 according to the first embodiment of the present disclosure. FIG. 3 is a schematic diagram illustrating the arrangement of the components of first to fourth planetary gear mechanisms included in the automatic transmission TM1. FIG. 4 is a nomogram illustrating ratios between relative speeds of the components of the first to fourth planetary gear mechanisms included in the automatic transmission TM1. As illustrated in FIG. 1, the automatic transmission TM1 according to the first embodiment includes the input shaft 2 rotatably supported in a transmission case 1, and an output gear 3 which is an output member disposed coaxially with the input shaft 2. The driving force outputted by the engine E being a drive source is transmitted to the input shaft 2 via the torque converter TC having the lock-up clutch LC and a damper DA.

The rotation of the output gear 3 is outputted to the output shaft 4 illustrated in FIG. 1 and is transmitted from the output shaft 4 to the right and left driving wheels of the vehicle via a differential gear or propeller shaft (not illustrated). Instead of the torque converter TC, a single plate type or multi-plate type start clutch may be provided which allows variable frictional engagement.

In the transmission case 1, the first to fourth planetary gear mechanisms PG 1 to 4 are disposed coaxially with the input shaft 2. The first planetary gear mechanism PG1 is so-called a single pinion type planetary gear mechanism including a sun gear Sa, a ring gear Ra, and a carrier Ca which pivotally supports a pinion Pa engaged with the sun gear Sa and the ring gear Ra in a rotatable and revolvable manner. In the first planetary gear mechanism PG1, when the sun gear Sa is rotated with the carrier Ca fixed, the ring gear Ra rotates in the opposite direction to the sun gear Sa. When the sun gear Sa is rotated with the ring gear Ra fixed, the carrier Ca rotates in the same direction as the sun gear Sa.

Referring to the nomogram (diagram capable of illustrating a ratio between the relative rotational speeds of three elements of the sun gear Sa, the carrier Ca, and the ring gear Ra by a straight line (speed line)) of the first planetary gear mechanism PG1 illustrated in the third part from the top of FIG. 4, the three elements Sa, Ca, Ra of the first planetary gear mechanism PG1 are referred to as the 1st element, the 2nd element, and the 3rd element, respectively, in the order from the left in a space interval corresponding to the gear ratio (the number of teeth of the ring gear/the number of teeth of the sun gear) in the nomogram. That is, the 1st element is the sun gear Sa, the 2nd element is the carrier Ca, and the 3rd element is the ring gear Ra. The ratio of the space interval between the sun gear Sa and the carrier Ca with respect to the space interval between the carrier Ca and the ring gear Ra is set to h:1, where h is the gear ratio of the first planetary gear mechanism PG1.

The second planetary gear mechanism PG2 is also so-called a single pinion type planetary gear mechanism including a sun gear Sb, a ring gear Rb, and a carrier Cb which pivotally supports a pinion Pb engaged with the sun gear Sb and the ring gear Rb in a rotatable and revolvable manner.

Referring to the nomogram of the second planetary gear mechanism PG2 illustrated in the fourth part (the lowermost part) from the top of FIG. 4, three elements Sb, Cb, Rb of the second planetary gear mechanism PG2 are referred to as the 4th element, the 5th element, and the 6th element, respectively, in the order from the left in a space interval corresponding to the gear ratio in the nomogram. That is, the 4th element is the ring gear Rb, the 5th element is the carrier Cb, and the 6th element is the sun gear Sb. The ratio of the space interval between the sun gear Sb and the carrier Cb with respect to the space interval between the carrier Cb and the ring gear Rb is set to i:1, where i is the gear ratio of the second planetary gear mechanism PG2.

The third planetary gear mechanism PG3 is also so-called a single pinion type planetary gear mechanism including a sun gear Sc, a ring gear Rc, and a carrier Cc which pivotally supports a pinion Pc engaged with the sun gear Sc and the ring gear Rc in a rotatable and revolvable manner.

Referring to the nomogram of the third planetary gear mechanism PG3 illustrated in the second part from the top of FIG. 4, three elements Sc, Cc, Rc of the third planetary gear mechanism PG3 are referred to as the 7th element, the 8th element, and the 9th element, respectively, in the order from the left in a space interval corresponding to the gear ratio in the nomogram. That is, the 7th element is the sun gear Sc, the 8th element is the carrier Cc, and the 9th element is the ring gear Rc.

Here, the ratio of the space interval between the sun gear Sc and the carrier Cc with respect to the space interval between the carrier Cc and the ring gear Rc is set to j:1, where j is the gear ratio of the third planetary gear mechanism PG3. It is to be noted that in the nomogram, the lower horizontal line and the upper horizontal line (the line overlapping with the 4th and 6th lines) indicate rotational speeds of "0" and "1" (the same rotational speed as the input shaft 2), respectively.

The fourth planetary gear mechanism PG4 is also so-called a single pinion type planetary gear mechanism including a sun gear Sd, a ring gear Rd, and a carrier Cd which pivotally supports a pinion Pd engaged with the sun gear Sd and the ring gear Rd in a rotatable and revolvable manner.

Referring to the nomogram of the fourth planetary gear mechanism PG4 illustrated in the first part (the uppermost part) from the top of FIG. 4, three elements Sd, Cd, Rd of the fourth planetary gear mechanism PG4 are referred to as the 10th element, the 11th element, and the 12th element, respectively, in the order from the left in a space interval corresponding to the gear ratio in the nomogram. That is, the 10th element is the ring gear Rd, the 11th element is the carrier Cd, and the 12th element is the sun gear Sd. The ratio of the space interval between the sun gear Sd and the carrier Cd with respect to the space interval between the carrier Cd and the ring gear Rd is set to k:1, where k is the gear ratio of the fourth planetary gear mechanism PG4.

The sun gear Sc (the 7th element) of the third planetary gear mechanism PG3 is connected to the input shaft 2. The ring gear Rb (the 4th element) of the second planetary gear mechanism PG2 is connected to the output gear 3.

The carrier Cc (the 8th element) of the third planetary gear mechanism PG3, the ring gear Ra (the 3rd element) of the first planetary gear mechanism PG1, and the carrier Cd (the 11th element) of the fourth planetary gear mechanism PG4 are connected together to form a first connected body Cc-Ra—Cd. The ring gear Rc (the 9th element) of the third planetary gear mechanism PG3 and the sun gear Sb (the 6th element) of the second planetary gear mechanism PG2 are connected together to form a second connected body Rc-Sb. The carrier Ca (the 2nd element) of the first planetary gear mechanism PG1 and the carrier Cb (the 5th element) of the second planetary gear mechanism PG2 are connected together to form a third connected body Ca-Cb.

The automatic transmission TM1 of the present embodiment is equipped with six engagement mechanisms including first to third clutches C1 to C3 and first to third brakes B1 to B3.

The first clutch C1 is a hydraulic operated wet multi-plate clutch and is configured to be switchable between a connected state and a released state, the connected state being in which the sun gear Sc (the 7th element) of the third planetary gear mechanism PG3 and the third connected body Ca-Cb are connected to each other, the released state being in which the connection is released.

The second clutch C2 is a hydraulic operated wet multi-plate clutch and is configured to be switchable between a connected state and a released state, the connected state being in which the sun gear Sd (the 12th element) of the fourth planetary gear mechanism PG4 and the second connected body Rc-Sb are connected to each other, the released state being in which the connection is released.

The third clutch C3 is a hydraulic operated wet multi-plate clutch and is configured to be switchable between a connected state and a released state, the connected state being in which the sun gear Sc (the 7th element) of third planetary gear mechanism PG3 and the ring gear Rd (the 10th element) of the fourth planetary gear mechanism PG4 are connected to each other, the released state being in which the connection is released.

The first brake B1 is a hydraulic operated wet multi-plate brake and is configured to be switchable between a fixed state and a released state, the fixed state being in which the sun gear Sa (the 1st element) of the first planetary gear mechanism PG1 is fixed to the transmission case 1, the released state being in which the fixation is released. The first brake B1 may be formed with a two-way clutch.

The second brake B2 is a hydraulic operated wet multi-plate brake and is configured to be switchable between a fixed state and a released state, the fixed state being in which the carrier Ca (the 2nd element) of the first planetary gear mechanism PG1 is fixed to the transmission case 1, the released state being in which the fixation is released. The second brake B2 may be formed with a two-way clutch.

The third brake B3 is a hydraulic operated wet multi-plate brake and is configured to be switchable between a fixed state and a released state, the fixed state being in which the sun gear Sd (the 12th element) of the fourth planetary gear mechanism PG4 is fixed to the transmission case 1, the released state being in which the fixation is released.

The state of each of the clutches C1 to C3 and the brakes B1 to B3 is shifted by the AT-ECU 5 based on vehicle information such as a running speed of the vehicle. That is, in the present embodiment, setting of a gear change stage and shifting of a gear change stage (down-shift and up-shift) are performed by the automatic transmission TM1 based on an area (gear change characteristic) on a predetermined map (shift map) of vehicle speed and accelerator opening.

FIG. 5 is a diagram illustrating the state of engagement mechanism for each of the gear change stages of the automatic transmission TM1 according to the first embodiment, and collectively illustrates the states of the clutches C1 to C3 and the brakes B1 to B3 in the below-described gear change stages. In FIG. 5, "○" in the column of each of the clutches C1 to C3 and the brakes B1 to B3 indicates a connected state or a fixed state, and blank in the column indicates a released state. Hereinafter, cases where respective gear change stages of the automatic transmission TM1 in the first embodiment are achieved will be described with reference to FIGS. 4 and 5.

In order to achieve the 1st gear stage, the first brake B1 is set in a fixed state, the second brake B2 is set in a fixed state, and the third brake B3 is set in a fixed state. Setting the second brake B2 in a fixed state prevents reverse operation of the third connected body Ca-Cb. Setting the first brake in a fixed state causes the rotational speed of the sun gear Sa (the 1st element) of the first planetary gear mechanism PG1 to be set to "0".

Consequently, the 1st to 3rd elements Sa, Ca, Ra of the first planetary gear mechanism PG1 are in a locked state in which relative rotation is not possible, and thus the rotational speed of the first connected body Cc-Ra—Cd including the ring gear Ra (the 3rd element) of the first planetary gear mechanism PG1 is also set to "0". The rotational speed of the ring gear Rb (the 4th element) of the second planetary gear mechanism PG2 is then set to the "1st" illustrated in FIG. 4, the ring gear Rb being connected to the output gear 3, and thus the 1st gear stage is achieved. In order to achieve the 1st gear stage, the third brake B3 is not necessarily in a fixed state. However, the third brake B3 is set in a fixed state herein so as to be able to be shifted from the 1st gear stage to the below-described 2nd gear stage smoothly.

In order to achieve the 2nd gear stage, the first brake B1 is set in a fixed state, the third brake B3 is set in a fixed state, and the second clutch C2 is set in a connected state. Setting the first brake B1 in a fixed state causes the rotational speed of the sun gear Sa (the 1st element) of the first planetary gear mechanism PG1 to be set to "0". In addition, setting the third brake B3 in a fixed state causes the rotational speed of the sun gear Sd (the 12th element) of the fourth planetary gear mechanism PG4 to be set to "0".

Furthermore, setting the second clutch C2 in a connected state causes the rotational speed of the second connected body Rc-Sb to be set to "0" which is the same speed as the rotational speed of the sun gear Sd (the 12th element) of the fourth planetary gear mechanism PG4. The rotational speed of the ring gear Rb (the 4th element) of the second planetary gear mechanism PG2 is then set to the "2nd" illustrated in FIG. 4, the ring gear Rb being connected to the output gear 3, and thus the 2nd gear stage is achieved.

In order to achieve the 3rd gear stage, the first brake B1 and third brake B3 are set in a fixed state, and the third clutch C3 is set in a connected state. Setting the first brake B1 in a fixed state causes the rotational speed of the sun gear Sa (the 1st element) of the first planetary gear mechanism PG1 to be set to "0". In addition, setting the third brake B3 in a fixed state causes the rotational speed of the sun gear Sd (the 12th element) of the fourth planetary gear mechanism PG4 to be set to "0".

Furthermore, setting the third clutch C3 in a connected state causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, the sun gear Sc being connected to the input shaft 2. Because the rotational speed of the sun gear Sd (the 12th element) of the fourth planetary gear mechanism PG4 is set to "0" and the rotational speed of the ring gear Rd (the 10th element) is set to "1", the rotational speed of the carrier Cd (the 11th element), that is, the rotational speed of the first connected body Cc-Ra—Cd is set to k/(k+1). The rotational speed of the ring gear Rb (the 4th element) of the second planetary gear mechanism PG2 is then set to the "3rd" illustrated in FIG. 4, the ring gear Rb being connected to the output gear 3, and thus the 3rd gear stage is achieved.

In order to achieve the 4th gear stage, the first brake B1 is set in a fixed state, and the second clutch C2 and the third clutch C3 are set in a connected state. Setting the first brake B1 in a fixed state causes the rotational speed of the sun gear Sa (the 1st element) of the first planetary gear mechanism PG1 to be set to "0".

In addition, setting the second clutch C2 in a connected state causes the sun gear Sd (the 12th element) of the fourth planetary gear mechanism PG4 and the second connected body Rc-Sb to rotate at the same speed. Thus, between the third planetary gear mechanism PG3 and the fourth planetary gear mechanism PG4, the carrier Cc (the 8th element) and the carrier Cd (the 11th element) are connected together and the ring gear Rc (the 9th element) and the sun gear Sd (the 12th element) are connected together. Thus, in the 4th gear stage in which the second clutch C2 is in a connected state, a nomogram including those four rotational elements in the third planetary gear mechanism PG3 and the fourth planetary gear mechanism PG4 may be illustrated.

Setting the third clutch C3 in a connected state then causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, and thus the rotational speed of those two rotational elements out of the four rotational elements included in the third planetary gear mechanism PG3 and the fourth planetary gear mechanism PG4 are set to the same speed "1".

Consequently, the elements included in the third planetary gear mechanism PG3 and the fourth planetary gear mechanism PG4 are set in a locked state in which relative rotation is not possible, and thus all the elements in the third planetary gear mechanism PG3 and the fourth planetary gear mechanism PG4 have a rotational speed of "1". The rotational speed of the third connected body Ca-Cb is then set to h/(h+1), and the rotational speed of the ring gear Rb (the 4th element) of the second planetary gear mechanism PG2 is set to the "4th" illustrated in FIG. 4, the ring gear Rb being connected to the output gear 3, and thus the 4th gear stage is achieved.

Next, the case where the 5th gear stage is achieved will be described. In the automatic transmission TM1 of the present embodiment, the below-described three types of engagement state may be set as engagement states (connected or fixed states) of the clutches C1 to C3 and the brakes B1 to B3 for achieving the 5th gear stage. In the following description, the 5th gear stage achieved by those three types of engagement state are respectively denoted as the "5th gear stage N mode (5thN)", the "5th gear stage A mode (5thA)" and the "5th gear stage B mode (5thB)".

First, in order to achieve the 5th gear stage N mode (5thN), the first brake B1 is set in a fixed state, and the first clutch C1 is set in a connected state. Setting the first brake B1 in a fixed state causes the rotational speed of the sun gear Sa (the 1st element) of the first planetary gear mechanism PG1 to be set to "0".

In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "5th" illustrated in FIG. 4, the ring gear Rb being connected to the output gear 3, and thus the 5th gear stage is achieved.

Similarly to the above-mentioned 5th gear stage N mode (5thN), in order to achieve the 5th gear stage A mode (5thA), the first brake B1 is set in a fixed state, and the first clutch C1 is set in a connected state. In addition, the third clutch C3 is set in a connected state. Setting the first brake B1 in a fixed state causes the rotational speed of the sun gear Sa (the 1st element) of the first planetary gear mechanism PG1 to be set to "0". In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "5th" illustrated in FIG. 4, the ring gear Rb being connected to the output gear 3, and thus the 5th gear stage is achieved.

In the 5th gear stage A mode (5thA), the third clutch C3 is not necessarily in a connected state in order to achieve the transmission gear ratio of the 5th gear stage. However, in the 4th gear stage and the below-described 6th gear stage, the third clutch C3 needs to be in a connected state, and thus by setting the third clutch C3 in a connected state in the 5th gear stage A mode, down-shift from the 5th gear stage to the 4th gear stage and up-shift from the 5th gear stage to the 6th gear stage may be smoothly performed.

Similarly to the above-mentioned 5th gear stage N mode (5thN), in order to achieve the 5th gear stage B mode (5thB), the first brake B1 is set in a fixed state, and the first clutch C1 is set in a connected state. In addition, the second clutch C2 is set in a connected state. Setting the first brake B1 in a fixed state causes the rotational speed of the sun gear Sa (the 1st element) of the first planetary gear mechanism PG1 to be set to "0". In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "5thB" illustrated in FIG. 4, the ring gear Rb being connected to the output gear 3, and thus the 5th gear stage B mode is achieved.

In the 5th gear stage B mode (5thB), the second clutch C2 is not necessarily in a connected state in order to achieve the transmission gear ratio of the 5th gear stage. However, in the 2nd gear stage and the below-described 8th gear stage, the second clutch C2 needs to be in a connected state, and thus by setting the second clutch C2 in a connected state, skip down-shift from the 5th gear stage to the 2nd gear stage and skip up-shift from the 5th gear stage to the 8th gear stage may be smoothly performed.

In order to achieve the 6th gear stage, the first to third clutches C1 to C3 are set in a connected state. As described above for the 4th gear stage, setting the second clutch C2 and the third clutch C3 in a connected state causes the elements included in the third planetary gear mechanism PG3 and the fourth planetary gear mechanism PG4 to be set in a locked state in which relative rotation is not possible, and thus the rotational speed of the second connected body Rc-Sb is set to "1". In addition, setting the first clutch C1 in a connected state causes the rotational speed of the third connected body Ca-Cb to be set to "1".

Consequently, in the second planetary gear mechanism PG2, the carrier Cb (the 5th element) and the sun gear Sb (the 6th element) are set to the same speed "1", and the elements are set in a locked state in which relative rotation is not possible. The rotational speed of the ring gear Rb (the 4th element) of the second planetary gear mechanism PG2 is then set to the "6th" illustrated in FIG. 4, the ring gear Rb being connected to the output gear 3, and thus the 6th gear stage is achieved.

In order to achieve the 7th gear stage, the third brake B3 is set in a fixed state, and the first clutch C1 and the third clutch C3 are set in a connected state. Setting the second brake B-2 in a reverse prevention state allows normal rotation of the third connected body Ca-Cb.

In addition, setting the third brake B3 in a fixed state causes the rotational speed of the sun gear Sd (the 12th element) of the fourth planetary gear mechanism PG4 to be set to "0". Furthermore, setting the third clutch C3 in a connected state causes the rotational speed of the ring gear Rd (the 10th element) of the fourth planetary gear mechanism PG4 to be set to "1" which is the same speed as the rotational speed of the sun gear Sc (the 7th element) of the third planetary gear mechanism PG3, and thus the rotational speed of the first connected body Cc-Ra—Cd is set to $k/(k+1)$.

In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3, the sun gear Sc being connected to the input shaft 2. The rotational speed of the ring gear Rb (the 4th element) of the second planetary gear mechanism PG2 is then set to the "7th" illustrated in FIG. 4, the ring gear Rb being connected to the output gear 3, and thus the 7th gear stage is achieved.

In order to achieve the 8th gear stage, the third brake B3 is set in a fixed state, and the first clutch C1 and the second clutch C2 are set in a connected state. Setting the second brake B2 in a reverse prevention state allows normal rotation of the third connected body Ca-Cb.

In addition, setting the third brake B3 in a fixed state causes the rotational speed of the sun gear Sd (the 12th element) of the fourth planetary gear mechanism PG4 to be set to "0". Furthermore, setting the second clutch C2 in a connected state causes the rotational speed of the second connected body Rc-Sb to be set to "0" which is the same speed as the rotational speed of the sun gear Sd (the 12th element) of the fourth planetary gear mechanism PG4. In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "8th"

illustrated in FIG. 4, the ring gear Rb being connected to the output gear 3, and thus the 8th gear stage is achieved.

In order to achieve reverse stage, the second brake B2 is set in a fixed state, the third brake B3 is set in a fixed state, and the third clutch C3 is set in a connected state. Setting the third brake B3 in a fixed state and setting the third clutch C3 in a connected state cause the rotational speed of the first connected body Cc-Ra-Cd to be set to k/(k+1). In addition, setting the second brake B2 in a fixed state prevents normal rotation of the third connected body Ca-Cb and causes the rotational speed of the third connected body Ca-Cb to be set to "0". The rotational speed of the ring gear Rb (the 4th element) of the second planetary gear mechanism PG2 is then set to reverse, that is, "Rvs" illustrated in FIG. 4, the ring gear Rb being connected to the output gear 3, and thus reverse stage is achieved.

Any speed line illustrated by a dashed line in FIG. 4 indicates that when some planetary gear mechanisms out of the four planetary gear mechanisms PG1 to PG4 transmit power, each element in the other planetary gear mechanisms follows the transmission and rotates (idles).

In the automatic transmission TM1 in the present embodiment, the above-mentioned 5th gear stage N mode (5thN), 5th gear stage A mode (5thA), and 5th gear stage B mode (5thB) may be set, and thereby the same transmission gear ratio (5th gear stage) may be achieved by different engagement states of the clutches C1 to C3 and the brakes B1 to B3. FIGS. 6A and 6B are tables illustrating shifting states of the clutches C1 to C3 and the brakes B1 to B3 in gear change from and to the 5th gear stage; FIG. 6A is a table illustrating the shifting states in the 5th gear stage A mode; and FIG. 6B is a table illustrating the shifting states in the 5th gear stage B mode.

As previously described, the third clutch C3 is engaged in the 5th gear stage A mode. Thus, as illustrated in FIG. 6A, gear change may be made between the 3rd gear stage (3rd) and the 5th gear stage A mode (5thA), between the 4th gear stage (4th) and the 5th gear stage A mode (5thA), between the 5th gear stage A mode (5thA) and the 6th gear stage (6th), and between the 5th gear stage A mode (5thA) and the 7th gear stage (7th) by shifting engagement between only two of the clutches C1 to C3 and the brakes B1 to B3 for each gear change. Specifically, for gear change between the third gear stage (3rd) and the 5th gear stage A mode (5thA), engagement is shifted between the third brake B3 (3rd gear stage) and the first clutch C1 (5th gear stage A mode); for gear change between the 4th gear stage (4th) and the 5th gear stage A mode (5thA), engagement is shifted between the second clutch C2 (4th gear stage) and the first clutch C1 (5th gear stage A mode); for gear change between the 5th gear stage A mode (5thA) and the 6th gear stage (6th), engagement is shifted between the first brake B1 (5th gear stage A mode) and the second clutch C2 (6th gear stage); and for gear change between the 5th gear stage A mode (5thA) and the 7th gear stage (7th), engagement is shifted between the first brake B1 (5th gear stage A mode) and the third brake B3 (7th gear stage). In this manner, for gear change from a state in which the 5th gear stage A mode is achieved, by shifting engagement between only two of the clutches C1 to C3 and the brakes B1 to B3, gear change by one stage (gear change to an adjacent gear change stage) and gear change with one stage skipped may be made.

The third clutch C3 is engaged in the 5th gear stage B mode. Thus, as illustrated in FIG. 6B, gear change may be made between the 2nd gear stage (2nd) and the 5th gear stage B mode (5thB), between the 4th gear stage (4th) and the 5th gear stage B mode (5thB), between the 5th gear stage B mode (5thB) and the 6th gear stage (6th), and between the 5th gear stage B mode (5thB) and the 8th gear stage (8th) by shifting engagement between only two of the clutches C1 to C3 and the brakes B1 to B3 for each gear change. Specifically, for gear change between the 2nd gear stage (2nd) and the 5th gear stage B mode (5thB), engagement is shifted between the third brake B3 (2nd gear stage) and the first clutch C1 (5th gear stage B mode); for gear change between the 4th gear stage (4th) and the 5th gear stage B mode (5thB), engagement is shifted between the third clutch C3 (4th gear stage) and the first clutch C1 (5th gear stage B mode); for gear change between the 5th gear stage B mode (5thB) and the 6th gear stage (6th), engagement is shifted between the first brake B1 (5th gear stage B mode) and the third clutch C3 (6th gear stage); and for gear change between the 5th gear stage B mode (5thB) and the 8th gear stage (8th), engagement is shifted between the first brake B1 (5th gear stage B mode) and the third brake B3 (8th gear stage). In this manner, for gear change from a state in which the 5th gear stage B mode is achieved, by shifting engagement between only two of the clutches C1 to C3 and the brakes B1 to B3, gear change by one stage (gear change to an adjacent gear change stage) and gear change with two stages skipped may be made.

Consequently, in the automatic transmission TM1 in the present embodiment, in addition to the above-mentioned 5th gear stage N mode (5thN), the 5th gear stage A mode (5thA) and the 5th gear stage B mode (5thB) may be set as engagement states of the clutches C1 to C3 and the brakes B1 to B3 for achieving the ratio of the 5th gear stage, and so many gear change stages may be assured which allow shift between the gear change stages by shifting engagement between only two of the clutches C1 to C3 and the brakes B1 to B3. Therefore, increased flexibility in switching between the gear change stages is provided, and thus linearity of the driving force of the vehicle is assured.

On the other hand, in the 5th gear stage A mode (5thA) and the 5th gear stage B mode (5thB), the work loss due to rotation of the components in the automatic transmission TM1 tends to increase compared with the 5th gear stage N mode (5thN). That is, in the 5th gear stage N mode (5thN), each of the second clutch C2, the third clutch C3, the second brake B2, and the third brake B3 is in a released state, and so the rotational speeds of the sun gear Sd and ring gear Rd of the fourth planetary gear mechanism PG4 cause a rotational state in which the losses of the elements are balanced, and thus the work loss due to rotation of the components in the automatic transmission TM1 has a minimum.

On the other hand, in the 5th gear stage A mode (5thA) or the 5th gear stage B mode (5thB), the third clutch C3 or the second clutch C2 is engaged (connected), and so the idling rotational speed between friction members of the second brake B2 (difference in rotational speed) is relatively high compared with the 5th gear stage N mode (5thN). Consequently, the drag loss which occurs in the second brake B2 is increased.

Hereinafter, the method for selecting the above-described 5th gear stage N mode (5thN), 5th gear stage A mode (5thA), and 5th gear stage B mode (5thB) when the above-described 5th gear stage is achieved as a gear change stage in the automatic transmission TM1 of the present embodiment will be described. First, when a gear change is made from another gear change stage to the 5th gear stage, during the time interval from the start of the gear change operation to the completion of the operation, the 5th gear stage A mode (5thA) or the 5th gear stage B mode (5thB) is selected as an engagement state of the clutches C1 to C3 and the brakes B1 to B3, and thereby the first clutch C1 and the first brake B1 which need to be engaged to achieve the 5th gear stage, and the second clutch C2 or the third clutch C3 which causes no change in the transmission gear ratio of the 5th gear stage by engagement are both engaged. The start of the gear change operation herein includes the case where a gear change command is issued from the AT-ECU 5.

Specifically, when a gear change (up-shift) from the third gear stage to the 5th gear stage is made, the 5th gear stage A mode (5thA) is selected during the time interval from the start of the gear change operation to its completion. Similarly, when a gear change (up-shift) is made from the 4th gear stage to the 5th gear stage, the 5th gear stage A mode (5thA) or the 5th gear stage B mode (5thB) is selected during the time interval from the start of the gear change operation to its completion. When a gear change (down-shift) is made from the 6th gear stage to the 5th gear stage, the 5th gear stage A mode (5thA) or the 5th gear stage B mode (5thB) is selected during the time interval from the start of the gear change operation to its completion. When a gear change (down-shift) is made from the 7th gear stage to the 5th gear stage, the 5th gear stage A mode (5thA) is selected during the time interval from the start of the gear change operation to its completion. When a gear change (down-shift) is made from the 8th gear stage to the 5th gear stage, the 5th gear stage B mode (5thB) is selected during the time interval from the start of the gear change operation to its completion.

After the operation of gear change to the 5th gear stage is completed, the second clutch C2 or the third clutch C3, which causes no change in the transmission gear ratio of the 5th gear stage by engagement, is released, and thereby the engagement state of the clutches C1 to C3 and the brakes B1 to B3 is shifted to the 5th gear stage N mode.

With the automatic transmission TM1 in the present embodiment, during the time until a gear change operation from another gear change stage to the 5th gear stage (corresponding to the specific gear change stage in an embodiment of the present disclosure) is completed, the second clutch C2 or the third clutch C3, which causes no change in the transmission gear ratio of the 5th gear stage by engagement, is engaged, and thereby the number of engagement shift between the clutches C1 to C3 and the brakes B1 to B3 in the gear change operation from another gear change stage to the 5th gear stage is reduced and thus a smooth gear change may be made. On the other hand, after the operation of gear change to the 5th gear stage is completed, the second clutch C2 or the third clutch C3 which causes no change in the transmission gear ratio of the 5th gear stage by engagement, is released. Thus, the sun gear Sd and ring gear Rd of the fourth planetary gear mechanism PG4 are in a rotational state in which the losses of the elements are balanced, the sun gear Sd and ring gear Rd each being one of the rotational elements that achieve the 5th gear stage. Therefore, the work loss due to rotation of the members in the automatic transmission TM1 may be reduced. Consequently, an energy loss of a gear change operation in the automatic transmission TM1 in a steady state is reduced, and thereby the fuel efficiency of the vehicle may be improved. Therefore, a smooth operation of gear change to the 5th gear stage and reduction in the energy loss in a steady state of the 5th gear stage may be achieved at the same time.

Furthermore, in the AT-ECU 5 which controls the automatic transmission TM1 of an embodiment of the present disclosure, when a gear change from the 5th gear stage (5th) to another gear change stage is determined to be necessary according a running condition of the vehicle such as a vehicle speed calculated from a rotational speed No of the output shaft 4 detected by the output shaft rotational speed sensor 203, or an accelerator pedal opening detected by the accelerator pedal opening sensor 207, the engagement state of the clutches C1 to C3 and the brakes B1 to B3 in the 5th gear stage is shifted from the 5th gear stage N mode (5thN) to the 5th gear stage A mode (5thA) or the 5th gear stage B mode (5thB). That is, out of the second clutch C2 and the third clutch C3 which cause no change in the transmission gear ratio of the 5th gear stage by engagement, any engagement mechanism necessary in order to achieve a destination gear change stage is engaged. Specifically, when a gear change is made from the 5th gear stage to one of the 3rd gear stage, the 4th gear stage, the 7th gear stage, and the 8th gear stage, the 5th gear stage N mode (5thN) is shifted to the 5th gear stage A mode (5thA) in which the third clutch C3 is engaged. When a gear change is made from the 5th gear stage to one of the 2nd gear stage, the 4th gear stage, the 6th gear stage, and the 8th gear stage, the 5th gear stage N mode (5thN) is shifted to the 5th gear stage B mode (5thB) in which the second clutch C2 is engaged.

After engagement of the second clutch C2 or the third clutch C3 is completed which is an engagement mechanism necessary in order to achieve a destination gear change stage, an engagement shift is made between one of the first clutch C1 and the second clutch C2, which is an engagement mechanism necessary in order to achieve the 5th gear stage (5th) and another engagement mechanism necessary in order to achieve a destination gear change stage. Specifically, when a gear change (down-shift) is made from the 5th gear stage to the 4th gear stage, the first clutch C1 which is engaged (connected) in the 5th gear stage A mode (5thA) or the 5th gear stage B mode (5thB) is released and the second clutch C2 which is to be engaged (connected) in the 4th gear stage is engaged. When a gear change (down-shift) is made from the 5th gear stage to the 3rd gear stage, the first clutch C1 which is engaged (connected) in the 5th gear stage A mode is released and the third brake B3 which is to be engaged (fixed) in the 3rd gear stage is engaged. When a gear change (down-shift) is made from the 5th gear stage to the 2nd gear stage, the first clutch C1 which is engaged (connected) in the 5th gear stage B mode is released and the third brake B3 which is to be engaged (fixed) in the 2nd gear stage is engaged. When a gear change (up-shift) is made from the 5th gear stage to the 6th gear stage, the first brake B1 which is engaged in the 5th gear stage A mode (5thA) or the 5th gear stage B mode (5thB) is released and the third clutch C3 which is to be engaged in the 6th gear stage is engaged. When a gear change (up-shift) is made from the 5th gear stage to the 7th gear stage, the first brake B1 which is engaged (fixed) in the 5th gear stage A mode (5thA) is released and the third brake B3 which is to be engaged (fixed) in the 7th gear stage is engaged. When a gear change (up-shift) is made from the 5th gear stage to the 8th gear stage, the first brake B1 which is engaged (fixed) in the 5th gear stage B mode (5thB) is released and the third brake B3 which is to be engaged (fixed) in the 8th gear stage is engaged.

With this configuration, in a steady state (state in which no gear change operation is performed) in the 5th gear stage, only the first clutch C1 and the first brake B1, which need to be engaged to achieve the 5th gear stage, are engaged. When a gear change from the 5th gear stage to another gear change stage is determined to be necessary, one of the second clutch C2 or the third clutch C3, which causes no change in the transmission gear ratio of the 5th gear stage and is necessary in order to achieve a destination gear change stage, is engaged. After engagement of the second clutch C2 or the third clutch C3 is completed which is an engagement mechanism necessary in order to achieve a destination gear change stage, an engagement shift is made between one of the first clutch C1 and the second clutch C2, which is an engagement mechanism necessary in order to achieve the 5th gear stage and another engagement mechanism (the first brake B1 or the third brake B3) necessary in order to achieve a destination gear change stage. Consequently, reduction in the energy loss in a steady state of the 5th gear change stage and a smooth shift of gear change stage from the 5th gear change stage to another gear change stage may be achieved at the same time.

In the automatic transmission TM1 in the present embodiment, multiple engagement mechanisms (the second clutch C2, the third clutch C3) are included in the engagement mechanisms which are necessary in order to achieve a destination gear change stage and are of the engagement mechanisms which cause no change in the transmission gear ratio of the 5th gear change stage (5th). With this configuration, in a shift of gear change stage from the 5th gear change stage, a plurality of engagement mechanisms corresponding to each of a plurality of gear change stages may be selected as engagement mechanisms necessary in order to achieve a destination gear change stage. Therefore, a smooth shift operation of gear change stage from the 5th gear change stage to another one of a plurality of gear change stages may be achieved.

In the automatic transmission TM1 in the present embodiment, the third clutch C3 and the second clutch C2 are included in the engagement mechanisms which are necessary in order to achieve a destination gear change stage and are of the engagement mechanisms which cause no change in the transmission gear ratio of the 5th gear stage (5th) by engagement, the third clutch C3 being an engagement mechanism needs to be engaged in order to achieve the 4th gear stage (4th) or the 6th gear stage (6th) which is one gear stage away higher or lower from the 5th gear stage (5th), and the 3rd gear stage (3rd) or the 7th gear stage (7th) which is two gear stages away from the 5th gear stage (5th), the second clutch C2 being another engagement mechanism needs to be engaged in order to achieve the 2nd gear stage (2nd) or the 8th gear stage (8th) which is three gear stages away higher or lower from the 5th gear stage (5th).

With this configuration, as a destination gear change stage from the 5th gear change stage, both a gear change stage which is one gear stage or two gear stages away higher or lower, and a gear change stage which is three gear stages away higher or lower may be selected. Therefore, any of a variety of gear change stages may be selected as a destination gear change stage from the 5th gear change stage, and thus variation of shifting between gear change stages by the automatic transmission TM1 may be increased.

Second Embodiment

Next, an automatic transmission according to a second embodiment of the present disclosure will be described. In the description of the second embodiment and corresponding drawings, components which are the same as or corresponding to those in the first embodiment are labeled with the same symbols, and hereinafter detailed description of the components will be omitted. The matter other than what is described below and the matter other than what is illustrated are the same as those in the first embodiment.

Figure 7:
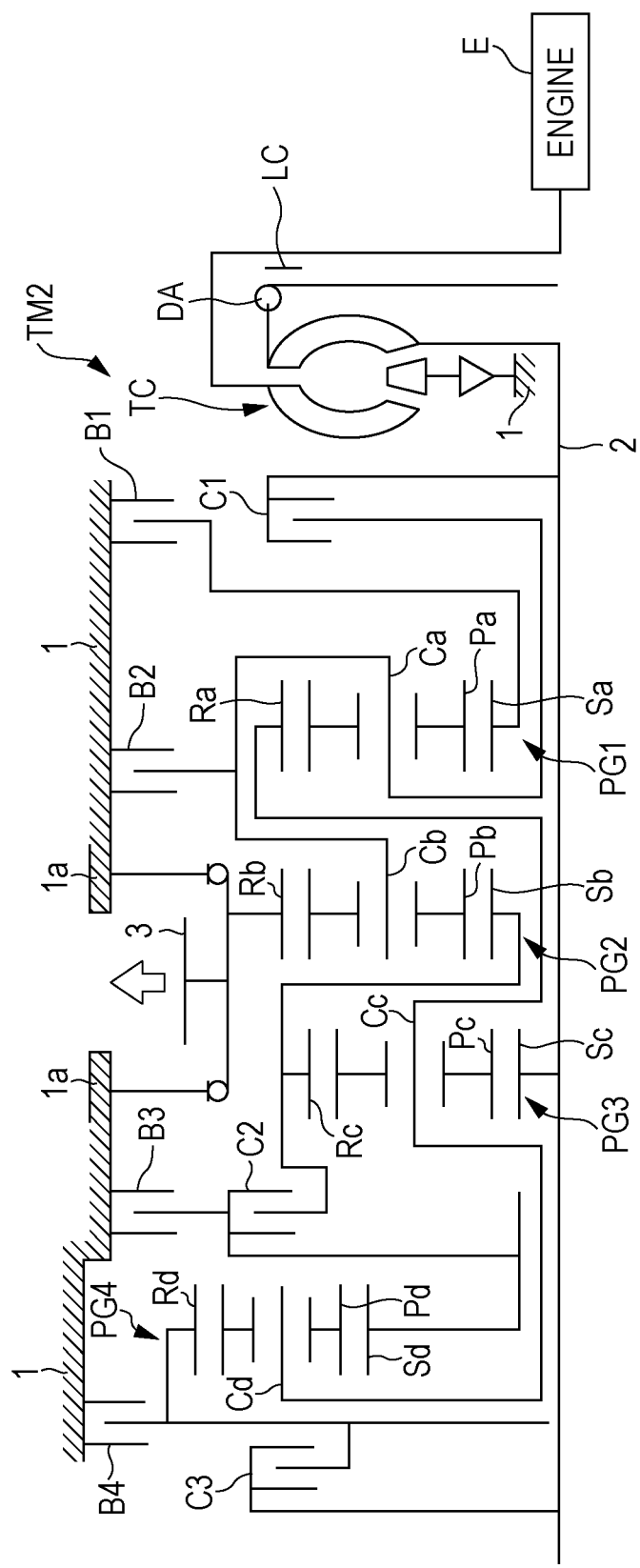
FIG. 7 is a skeleton diagram illustrating an automatic transmission according to a second embodiment of the present disclosure.

FIG. 7 is a skeleton diagram illustrating an automatic transmission TM2 according to the second embodiment of the present disclosure. As illustrated in FIG. 7, the automatic transmission TM2 of the present embodiment includes seven engagement mechanisms consisting of the first to third clutches C1 to C3 and the first to fourth brakes B1 to B4 by adding the fourth brake B4 as an engagement mechanism to the automatic transmission TM1 according to the first embodiment.

The fourth brake B4 is a wet multi-plate brake and is configured to be switchable between a fixed state and a released state, the fixed state being in which the ring gear Rd (the 10th element) of the fourth planetary gear mechanism PG4 is fixed to the transmission case 1, the released state being in which the fixation is released. Similarly to the clutches C1 to C3 and the brakes B1 to B3, the state of the fourth brake B4 is changed by the AT-ECU 5 based on vehicle information such as a running speed of the vehicle.

Figure 8:
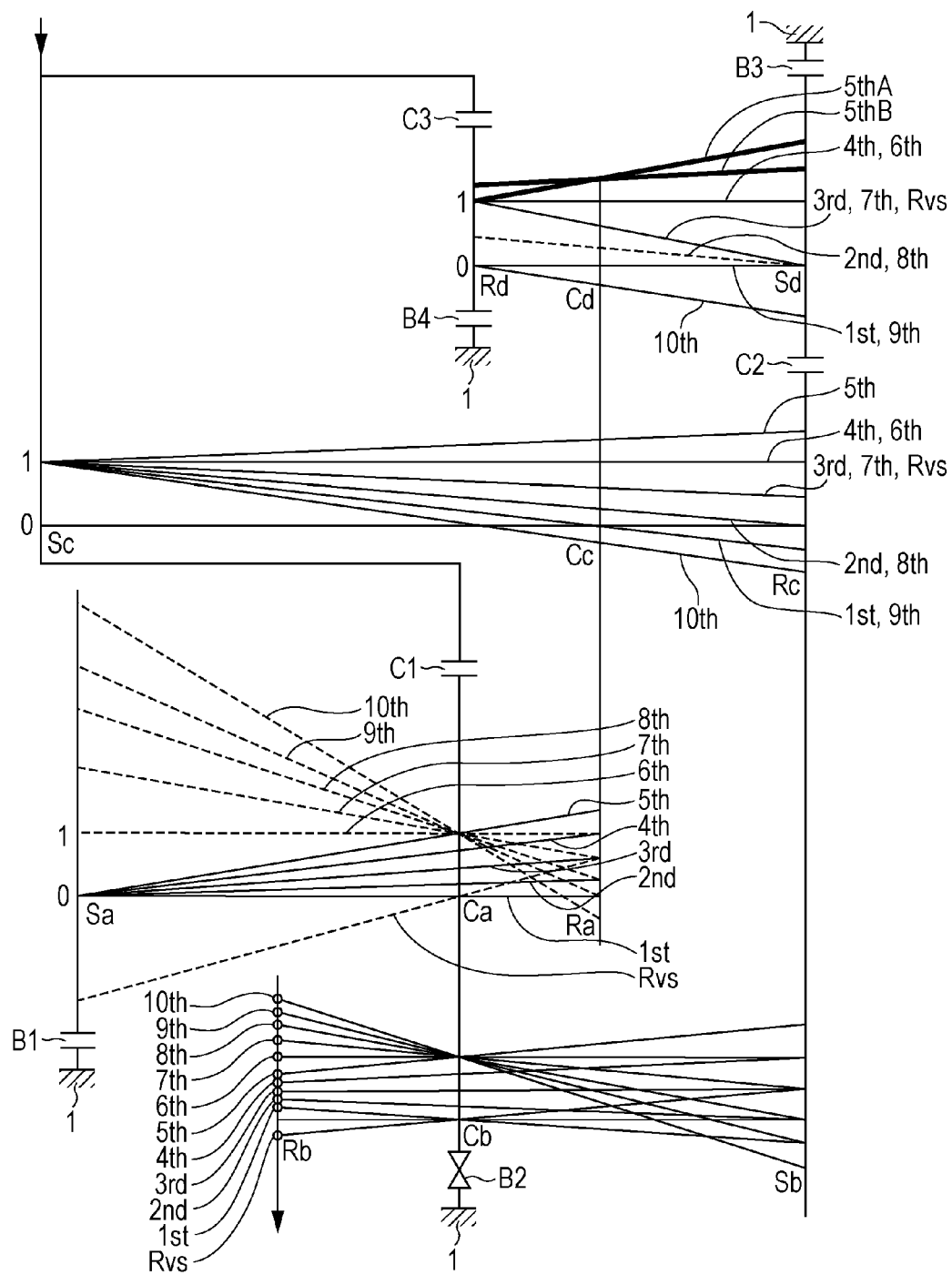
FIG. 8 is a nomogram illustrating ratios between relative speeds of the components of first to fourth planetary gear mechanisms included in the automatic transmission according to the second embodiment.

FIG. 8 is a nomogram illustrating ratios between relative speeds of the components of first to fourth planetary gear mechanisms included in the automatic transmission TM2 according to the second embodiment. FIG. 9 is a table illustrating the state of engagement mechanism for each of the gear change stages in the automatic transmission TM2 according to the second embodiment. Hereinafter, cases where respective gear change stages of the automatic transmission TM2 according to the second embodiment are achieved will be described with reference to FIGS. 8 and 9. The 1st to 8th gear stages and reverse stage are achieved in the same manner as those stages are achieved by the automatic transmission TM1 in the first embodiment, and thus description is omitted.

In order to achieve the 9th gear stage, the third brake B3 and the fourth brake B4 are set in a fixed state, and the first clutch C1 is set in a connected state. Setting the third brake B3 in a fixed state causes the rotational speed of the sun gear Sd (the 12th element) of the fourth planetary gear mechanism PG4 to be set to "0". In addition, setting the fourth brake B4 in a fixed state causes the rotational speed of the ring gear Rd (the 10th element) of the fourth planetary gear mechanism PG4 to be set to "0", too. Therefore, the elements Sd, Cd, Rd of the fourth planetary gear mechanism PG4 are in a locked state in which relative rotation is not possible, and thus the rotational speed of the first connected body Cc-Ra—Cd including the carrier Cd (the 11th element) of the fourth planetary gear mechanism PG4 is also set to "0".

Furthermore, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "9th" illustrated in FIG. 8, the ring gear Rb being connected to the output gear 3, and thus the 9th gear stage is achieved.

In order to achieve the 10th gear stage, the fourth brake B4 are set in a fixed state, and the first clutch C1 and the second clutch C2 are set in a connected state. Setting the second clutch C2 in a connected state causes the second connected body Rc-Sb and the sun gear Sd (the 12th element) of the fourth planetary gear mechanism PG4 to rotate at the same speed. In addition, setting the fourth brake B4 in a fixed state causes the rotational speed of the ring gear Rd (the 10th element) of the fourth planetary gear mechanism PG4 to be set to "0". In addition, setting the first clutch C1 in a connected state causes the rotational speed of the third connected body Ca-Cb to be set to "1" which is the same speed as the rotational speed of the sun gear Sc (the 7th element) of the third planetary gear mechanism PG3. The rotational speed of the ring gear Rb (the 4th element) of the second planetary gear mechanism PG2 is then set to the "10th" illustrated in FIG. 11, the ring gear Rb being connected to the output gear 3, and thus the 10th gear stage is achieved.

With the automatic transmission TM2 in the second embodiment, gear change to any of forward 10 gear stages may be made. Similarly to the automatic transmission TM1 in the first embodiment, as an engagement state (connected or fixed state) of the clutches C1 to C3 and the brakes B1 to B4 for achieving the 5th gear stage, three engagement states in type: the 5th gear stage N mode (5thN), the 5th gear stage A mode (5thA), and the 5th gear stage B mode (5thB) may be set. The selection method (switching method) for the 5th gear stage N mode (5thN), the 5th gear stage A mode (5thA), and the 5th gear stage B mode (5thB) is the same as that of the first embodiment.

So far, the embodiments of the present disclosure have been described, however, the present disclosure is not limited to the above-described embodiments and various modifications may be made in a scope of the technical concepts described in the claims, the description and the drawings. For example, in the above-described embodiment, the 5th gear stage serving as the specific gear change stage has been described as an example. As a plurality of engagement mechanisms (C1 to C3, B1 to B3) to be engaged when a gear change stage is achieved, the specific gear change stage involves one or a plurality of engagement mechanisms which needs to be engaged in order to obtain the transmission gear ratio of the gear change stage (5th), and one or a plurality of engagement mechanisms which cause no change in the transmission gear ratio by further engagement with the gear change stage achieved. The specific gear change stage according to an embodiment of the present disclosure may be a gear change stage other than the 5th gear stage described above.

In the above-described embodiments, the case has been described where the ring gear Rb of the second planetary gear mechanism PG2 and the output gear 3 are fixed. However, the ring gear Rc of the third planetary gear mechanism PG3 and the output gear 3 may be fixed to each other.

Each of the first brake B1 and the second brake B2 is formed with a wet multi-plate. However, in addition to this, the first brake B1 may be formed with a wet multi-plate brake and the second brake B2 may be formed with a two-way clutch; the first brake B1 may be formed with a two-way clutch and the second brake B2 may be formed with a wet multi-plate brake; or at least one of the first brake B1 and the second brake B2 may be formed with an engaging mechanism.

When the first brakes B1 is formed with a two-way clutch, it is sufficient that the 1st to the 5th gear stages are set in a reverse prevention state, and to activate engine braking at each gear stage, the 1st to the 5th gear stages are switched to a forward prevention state.

The fourth brake B4 may be formed with an engaging mechanism, and in this case, loss due to clutch dragging may be reduced.

In the automatic transmission TM2 in the second embodiment, one of the gear change stages (for example, 10th gear stage) may be omitted and gear change of the 9th forward gear stage may be made.

A control device for an automatic transmission according to an embodiment of the present disclosure includes: an automatic transmission including a drive source (E) of a vehicle, an input shaft (2) to which driving force from the drive source (E) is inputted, a plurality of planetary gear mechanisms (PG1 to PG4) each equipped with rotational elements including a sun gear, a carrier, and a ring gear, and a plurality of engagement mechanisms (C1 to C3, B1 to B3) each configured to releasably connect two of the rotational elements of the planetary gear mechanisms (PG1 to PG4) or to releasably fix one of the rotational elements to a member (1) on a fixed side, the automatic transmission (TM) being configured to achieve each of a plurality of gear change stages with different transmission gear ratios by an engagement combination of the engagement mechanisms (C1 to C3, B1 to B3), and to output the driving force from the drive source (E) to an output shaft (4) at one of the transmission gear ratios of the gear change stages; a running condition detector (201 to 203, 207) configured to detect a running condition of the vehicle; and a control unit (5) configured to set one of the gear change stages according a running condition of the vehicle detected by the running condition detector. At least one gear change stage (5th) of the gear change stages is a specific gear change stage (5th) that involves at least one engagement mechanism (C1, C2) which needs to be engaged in order to obtain a transmission gear ratio of the at least one gear change stage (5th), and at least one engagement mechanism (C2, C3) which causes no change in the transmission gear ratio by further engagement with the at least one gear change stage (5th) achieved, as a plurality of engagement mechanisms (C1 to C3, B1 to B3) to be engaged when the at least one gear change stage is achieved, both the at least one engagement mechanism (C1, C2) which needs to be engaged in order to achieve the specific gear change stage (5th), and the at least one engagement mechanism (C2, C3) which causes no change in the transmission gear ratio are engaged during a time interval from a start of an operation of gear change to the specific gear change stage (5th) until the operation is completed, and after the completion of the operation of gear change to the specific gear change stage (5th), the at least one engagement mechanism (C2, C3) which causes no change in the transmission gear ratio is released.

With the control device for an automatic transmission according to an embodiment of the present disclosure, during the time until an operation of gear change to the specific gear change stage is completed, the engagement mechanisms which cause no change in the transmission gear ratio are engaged, and thereby the number of engagement shift between the engagement mechanisms in the operation of gear change from another gear change stage to the specific gear change stage is reduced and thus a smooth gear change may be made. On the other hand, after the operation of gear change to the specific gear change stage is completed, the engagement mechanisms which cause no change in the transmission gear ratio are released. Thus, at least one of the rotational elements achieving the specific gear change stage is capable of assuming a rotational state in which the losses of the elements are balanced. Therefore, the work loss due to rotation of the members in the automatic transmission may be reduced. Consequently, an energy loss of a gear change operation in the automatic transmission in a steady state is reduced, and thereby the fuel efficiency of the vehicle may be improved. Therefore, a smooth operation of gear change to the specific gear change stage and reduction in the energy loss in a steady state may be achieved at the same time.

In the above-described control device for an automatic transmission, when a gear change from the specific gear change stage (5th) to another gear change stage is determined to be necessary by the control unit (5) according a running condition of the vehicle, an engagement mechanism (C2, C3) necessary in order to achieve a destination gear change stage may be engaged by the control unit, the engagement mechanism being of the at least one engagement mechanism which causes no change in the transmission gear ratio of the specific gear change stage (5th), and after engagement of the engagement mechanism (C2, C3) necessary in order to achieve the destination gear change stage is completed, one of the at least one engagement mechanism (C1, C2) which needs to be engaged in order to achieve the specific gear change stage (5th) may be released and another engagement mechanism necessary in order to achieve the destination gear change stage may be engaged. With this configuration, reduction in the energy loss in a steady state of the specific gear change stage and a smooth shift of gear change stage from the specific gear change stage to another gear change stage may be achieved at the same time.

In the above-described control device for an automatic transmission, the engagement mechanism (C2, C3) necessary in order to achieve a destination gear change stage may include a plurality of engagement mechanisms (C2, C3), the engagement mechanism being of the at least one engagement mechanism which causes no change in the transmission gear ratio of the specific gear change stage (5th).

With this configuration, in a shift of gear change stage from the specific gear change stage, a plurality of engagement mechanisms corresponding to each of a plurality of gear change stages may be selected as engagement mechanisms necessary in order to achieve a destination gear change stage. Therefore, a smooth shift operation of gear change stage from the specific gear change stage to another one of a plurality of gear change stages may be achieved.

In the above-described control device for an automatic transmission, out of the at least one engagement mechanism which causes no change in the transmission gear ratio of the specific gear change stage (5th), the engagement mechanism (C2, C3) necessary in order to achieve a destination gear change stage may include: an engagement mechanism (C3) which needs to be engaged in order to achieve a gear change stage which is one gear stage (4th, 6th) or two gear stages (3rd, 7th) away higher or lower from the specific gear change stage (5th); and another engagement mechanism (C2) which needs to be engaged in order to achieve a gear change stage (2nd, 8th) which is three gear stages away higher or lower from the specific gear change stage (5th).

With this configuration, as a destination gear change stage from the specific gear change stage, both a gear change stage which is one gear stage or two gear stages away higher or lower, and a gear change stage which is three gear stages away higher or lower may be selected. Therefore, any of a variety of gear change stages may be selected as a destination gear change stage from the specific gear change stage, and thus variation of shifting between gear change stages by the automatic transmission may be increased. The symbols in the above parentheses are provided so that the symbols of the components in the below-described embodiments are each illustrated as an example of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic transmission which includes an input shaft to which driving force generated by a drive source of a vehicle is transferred, a plurality of planetary gear mechanisms each including rotational elements having a sun gear, a carrier, and a ring gear, and a plurality of engagement mechanisms each configured to releasably connect two of the rotational elements of the plurality of planetary gear mechanisms or to releasably fix at least one of the rotational elements to a member on a fixed side, the automatic transmission being configured to achieve a plurality of gear change stages with different transmission gear ratios by changing an engagement combination state of the plurality of engagement mechanisms, the control apparatus comprising:
a running condition detector configured to detect a running condition of the vehicle; and
a controller configured to set one of the plurality of gear change stages according to the running condition of the vehicle detected by the running condition detector, the plurality of gear change stages including at least one specific gear change stage that has a specific transmission gear ratio, that involves at least one necessary engagement mechanism which needs to be engaged in order to obtain the specific transmission gear ratio, and that involves at least one no-change engagement mechanism which causes no change in the specific transmission gear ratio, both of the at least one necessary engagement mechanism and the at least one no-change engagement mechanism being engaged during a time period from a timing to begin an operation to change a gear change stage to the specific gear change stage until a timing to complete the operation, the at least one no-change engagement mechanism being released after the timing to complete the operation.

2. The control apparatus for the automatic transmission according to claim 1,
wherein when a gear change from the specific gear change stage to another gear change stage is determined to be necessary by the controller according to a running condition of the vehicle, an engagement mechanism necessary in order to achieve a destination gear change stage is engaged by the controller, the engagement mechanism being of the at least one no-change engagement mechanism which causes no change in the specific transmission gear ratio of the specific gear change stage, and
after engagement of the engagement mechanism necessary in order to achieve the destination gear change stage is completed, one of the at least one necessary engagement mechanism which needs to be engaged in order to achieve the specific gear change stage is released and another engagement mechanism necessary in order to achieve the destination gear change stage is engaged.

3. The control apparatus for the automatic transmission according to claim 1,
wherein an engagement mechanism necessary in order to achieve a destination gear change stage includes a plurality of engagement mechanisms, the engagement mechanism being of the at least one no-change engagement mechanism which causes no change in the specific transmission gear ratio of the specific gear change stage.

4. The control apparatus for the automatic transmission according to claim 3,
wherein out of the at least one no-change engagement mechanism which causes no change in the specific transmission gear ratio of the specific gear change stage, the engagement mechanism necessary in order to achieve a destination gear change stage includes
an engagement mechanism which needs to be engaged in order to achieve a gear change stage which is one gear stage or two gear stages away to a higher or lower gear from the specific gear change stage, and
another engagement mechanism which needs to be engaged in order to achieve a gear change stage which is three gear stages away to a higher or lower gear from the specific gear change stage.

5. A vehicle comprising:
a drive source;
an automatic transmission comprising:
an input shaft to which driving force generated by the drive source is transferred;
a plurality of planetary gear mechanisms each including rotational elements having a sun gear, a carrier, and a ring gear;
a plurality of engagement mechanisms each configured to releasably connect two of the rotational elements of the plurality of planetary gear mechanisms or to releasably fix at least one of the rotational elements to a member on a fixed side; and the automatic transmission being configured to achieve a plurality of gear change stages with different transmission gear ratios by changing an engagement combination state of the plurality of engagement mechanisms; and a control apparatus comprising:

a running condition detector configured to detect a running condition of the vehicle; and a controller configured to set one of the plurality of gear change stages according to the running condition of the vehicle detected by the running condition detector, the plurality of gear change stages including at least one specific gear change stage that has a specific transmission gear ratio, that involves at least one necessary engagement mechanism which needs to be engaged in order to obtain the specific transmission gear ratio, and that involves at least one no-change engagement mechanism which causes no change in the specific transmission gear ratio, both of the at least one necessary engagement mechanism and the at least one no-change engagement mechanism being engaged during a time period from a timing to begin an operation to change a gear change stage to the specific gear change stage until a timing to complete the operation, the at least one no-change engagement mechanism being released after the timing to complete the operation.

* * * * *